US010025536B2

(12) United States Patent
Manohar et al.

(10) Patent No.: US 10,025,536 B2
(45) Date of Patent: Jul. 17, 2018

(54) MEMORY SYSTEM AND METHOD FOR SIMPLIFYING SCHEDULING ON A FLASH INTERFACE MODULE AND REDUCING LATENCIES IN A MULTI-DIE ENVIRONMENT

(71) Applicant: SanDisk Technologies Inc., Plano, TX (US)

(72) Inventors: Abhijeet Manohar, Bangalore (IN); Hua-Ling Cynthia Hsu, Fremont, CA (US); Daniel E. Tuers, Kapaa, HI (US)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 15/040,639

(22) Filed: Feb. 10, 2016

(65) Prior Publication Data

US 2017/0228167 A1    Aug. 10, 2017

(51) Int. Cl.
*G06F 3/06* (2006.01)
(52) U.S. Cl.
CPC ............ *G06F 3/0688* (2013.01); *G06F 3/061* (2013.01); *G06F 3/0659* (2013.01)
(58) Field of Classification Search
CPC ............... G06F 1/1632; G06F 13/4243; G06F 13/1668; G06F 13/1694; G06F 3/0613; G06F 3/0659; G06F 3/0679; G06F 12/00; G06F 2212/1016; G06F 1/26; G06F 11/1068; G06F 1/3203; G06F 1/32; G06F 3/0604; G06F 12/0623; G06F 2213/0038
USPC ..... 711/103, 154, 5, 170, E12.001, E12.008, 711/163, 167, E12.002, 1, 104, 156, 168
See application file for complete search history.

(56) References Cited

U.S. PATENT DOCUMENTS

| 5,485,623 | A | * | 1/1996 | Kurokawa | ............ G06F 1/3203 |
| | | | | | 714/22 |
| 8,245,004 | B2 | * | 8/2012 | Arimilli | .............. G06F 9/30032 |
| | | | | | 711/165 |
| 2001/0003837 | A1 | * | 6/2001 | Norman | .............. G06F 12/0661 |
| | | | | | 711/5 |
| 2007/0143556 | A1 | * | 6/2007 | Kadota | ................ G11C 7/1051 |
| | | | | | 711/163 |
| 2013/0073797 | A1 | * | 3/2013 | Chowdhury | ....... G11C 16/3418 |
| | | | | | 711/103 |
| 2014/0293704 | A1 | * | 10/2014 | Ghalam | ................. G11C 16/30 |
| | | | | | 365/185.18 |
| 2016/0179402 | A1 | * | 6/2016 | Iwashiro | ............... G06F 3/0611 |
| | | | | | 711/103 |

(Continued)

*Primary Examiner* — Tuan Thai
*Assistant Examiner* — Edward Waddy, Jr.
(74) *Attorney, Agent, or Firm* — Brinks Gilson & Lione

(57) ABSTRACT

A memory system and method for simplifying scheduling on a flash interface module and reducing latencies in a multi-die environment are provided. In one embodiment, a memory die is provided comprising a memory array, an interface, at least one register, and circuitry. The circuitry is configured to receive, via the interface, a pause command from a controller in communication with the memory die; and in response to receiving the pause command: pause a data transfer between the memory die and the controller; and while the data transfer is paused and until a resume command is received, maintain state(s) of the at least one register irrespective of inputs received via the interface that would otherwise change the state(s) of the at least one register. Other embodiments are provided.

21 Claims, 9 Drawing Sheets

(56) References Cited

U.S. PATENT DOCUMENTS

2016/0379715 A1* 12/2016 Pelster ................... G11C 16/16
                                                           365/185.12

* cited by examiner

MEMORY SYSTEM AND METHOD FOR SIMPLIFYING SCHEDULING ON A FLASH INTERFACE MODULE AND REDUCING LATENCIES IN A MULTI-DIE ENVIRONMENT

BACKGROUND

Some memory systems, such as solid-state drives (SSDs), contain one or more memory dies having blocks of memory that can be read or written in parallel. However, there is often a single channel or bus between the plurality of memory dies and a controller. So, for example, if data is being transferred over the bus from the controller to one of the memory dies for a write operation, the bus may be busy for a relatively-long time, preventing new commands from being issued to the other memory dies. However, some memory systems give priority to read commands and have read response latency requirements, requiring a read command be serviced in a certain period of time (e.g., 50 microseconds). In such systems, a write operation to one die (die 0) can be interrupted if a read command is sent to another die (die 1). After the read command is sent, the controller would resend the write command to the die 0, and the data transfer would start from the beginning, resulting in re-sending previously-sent data.

DETAILED DESCRIPTION

Overview

Figure 1A:
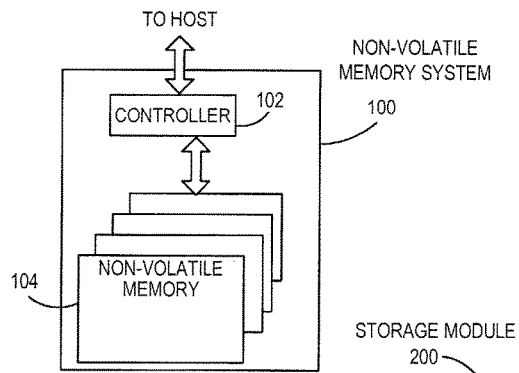
FIG. 1A is a block diagram of a non-volatile memory system of an embodiment.

By way of introduction, the below embodiments relate to a memory system and method for simplifying scheduling on a flash interface module and reducing latencies in a multi-die environment. In one embodiment, a memory die is provided comprising a memory array, an interface, at least one register, and circuitry in communication with the memory array, the interface, and the at least one register. The circuitry is configured to receive, via the interface, a pause command from a controller in communication with the memory die; and in response to receiving the pause command: pause a data transfer between the memory die and the controller; and while the data transfer is paused and until a resume command is received, maintain state(s) of the at least one register irrespective of inputs received via the interface that would otherwise change the state(s) of the at least one register.

In some embodiments, the data transfer between the memory die and the memory controller is in response to a write command, while, in other embodiments, the data transfer between the memory die and the memory controller is in response to a read command.

In some embodiments, the interface comprises pin(s) for at least one of the following: chip enable, command latch, address, write enable, read enable, data transfer.

In some embodiments, the at least one register comprises one or more of the following registers: a command register, an address register, a datapath control register, and a column redundancy control register.

In some embodiments, the memory array comprises a three-dimensional memory array.

In some embodiments, the memory die is part of a memory system embedded in a host, while, in other embodiments, the memory die is part of a memory system removably connected to a host.

In another embodiment, a memory system is provided comprising a plurality of memory dies and a controller in communication with the plurality of memory dies. The controller is configured to send a command to a first memory die of the plurality of memory dies to pause a data transfer between the controller and the first memory die; while the data transfer between the controller and the first memory die is paused, communicate with a second memory die of the plurality of memory dies; and after communicating with the second memory die, resume the data transfer between the controller and the first memory die.

In some embodiments, the data transfer is resumed after the controller sends a resume command.

In some embodiments, the data transfer between the first memory die and the controller is in response to a write command, while, in other embodiments, the data transfer between the first memory die and the controller is in response to a read command.

In some embodiments, at least one of the plurality of memory dies comprises a three-dimensional memory array.

In some embodiments, the memory system is embedded in a host, while, in other embodiments, the memory system is removably connected to a host.

In some embodiments, the controller comprises a host interface, a memory management layer, and a plurality of die queues for the respective plurality of memory dies.

In another embodiment, a method for reducing latencies in a multi-die environment, the method comprising. In this method, while data is being transferred between the controller and the first memory die, the controller sends a request to the first memory die to pause the data transfer and sends a request to the second memory die. After the request to the second die is sent, the controller resumes the data transfer between the controller and the first memory die. Pausing the data transfer between the controller and the first memory die avoids the controller having to wait until the data transfer between the controller and the first memory die is complete before sending the request to the second memory die.

In some embodiments, the data transfer between the controller and the first memory die is resumed after sending a resume command.

In some embodiments, the data transfer request to the first memory die comprises a write command, while, in other embodiments, the data transfer request to the first memory die comprises a read command.

In some embodiments, at least one of the first and second memory dies comprises a three-dimensional memory array.

In some embodiments, the memory system is embedded in a host, while, in other embodiments, the memory system is removably connected to a host.

Other embodiments are possible, and each of the embodiments can be used alone or together in combination. Accordingly, various embodiments will now be described with reference to the attached drawings.

Exemplary Embodiments

Figure 1B:
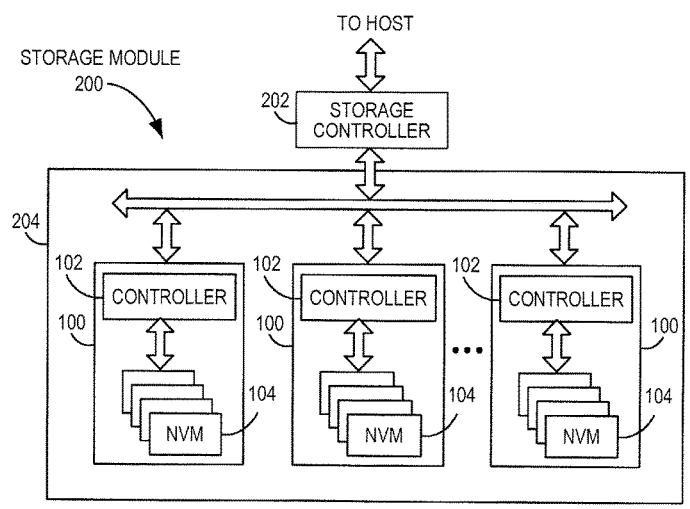
FIG. 1B is a block diagram illustrating an exemplary storage module of an embodiment.
Figure 1C:
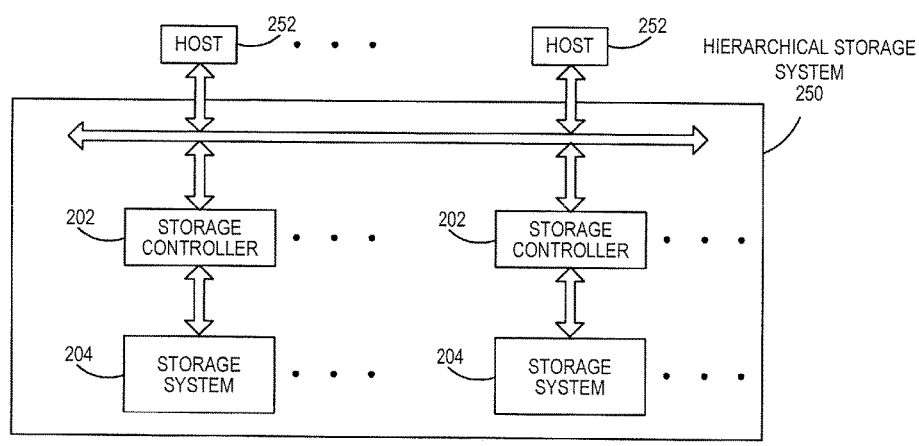
FIG. 1C is a block diagram illustrating a hierarchical storage system of an embodiment.

Memory systems suitable for use in implementing aspects of these embodiments are shown in FIGS. 1A-1C. FIG. 1A is a block diagram illustrating a non-volatile memory system 100 according to an embodiment of the subject matter described herein. Referring to FIG. 1A, non-volatile memory system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although, in the example illustrated in FIG. 1A, non-volatile memory system 100 (sometimes referred to herein as a storage module) includes a single channel between controller 102 and non-volatile memory die 104, the subject matter described herein is not limited to having a single memory channel. For example, in some NAND memory system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
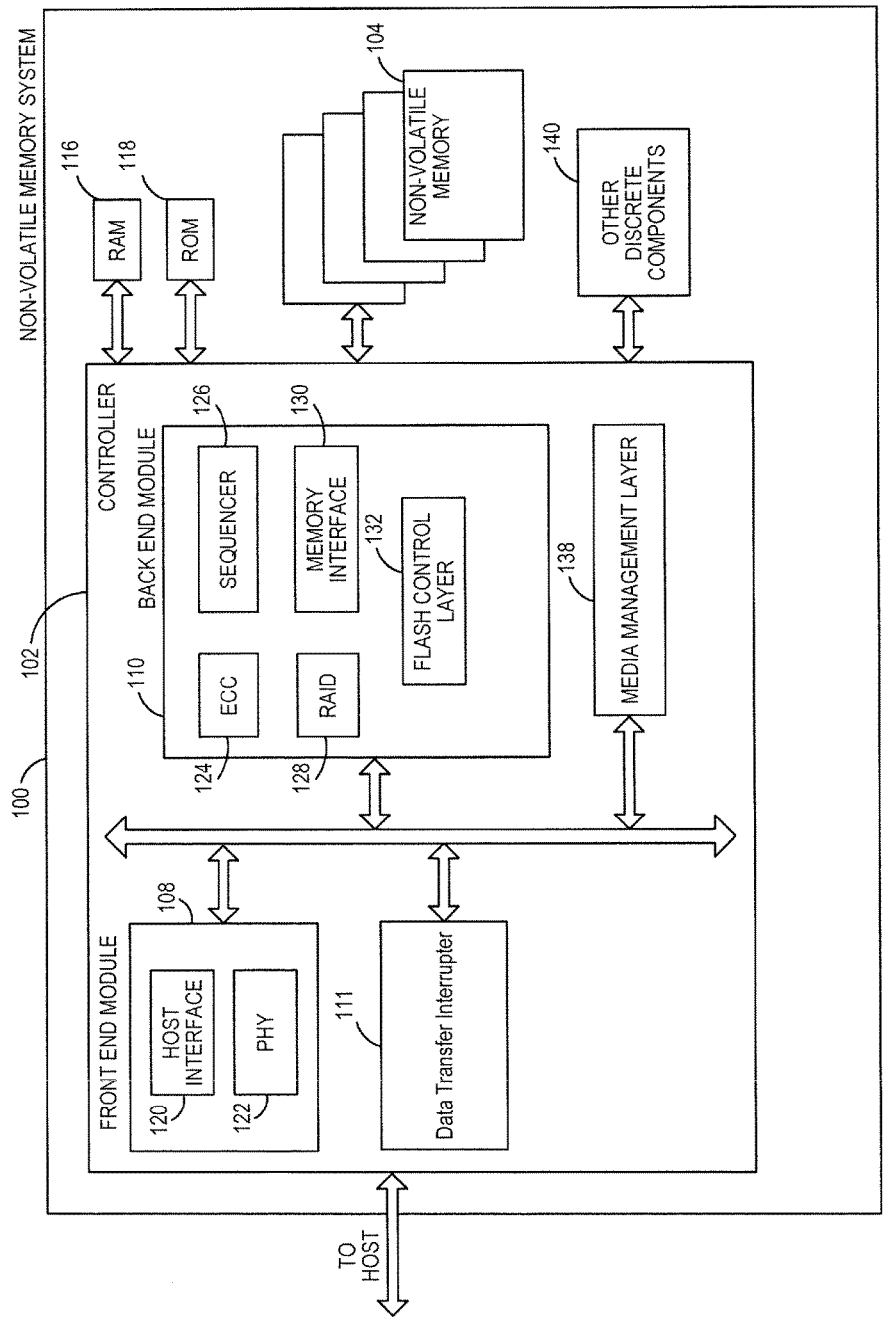
FIG. 2A is a block diagram illustrating exemplary components of the controller of the non-volatile memory system illustrated in FIG. 1A according to an embodiment.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a data transfer interrupter 111, which is configured to send a command to one of the memory dies 104 to pause a data transfer between the controller 102 and that memory die 104. Implementation of the functionality of these modules will be discussed in more detail below.

Referring again to modules of the controller 102, a buffer manager/bus controller (not shown) manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 (also known as a flash interface module) generates command sequences, such as program and erase command sequences, and schedules those sequences to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The memory system 100 also includes other discrete components 140, such as external electrical interfaces, external RAM, resistors, capacitors, or other components that may interface with controller 102. In alternative embodiments, one or more of the physical layer interface 122, RAID module (not shown), media management layer 138 and buffer management/bus controller (not shown) are optional components that are not necessary in the controller 102.

Figure 2B:
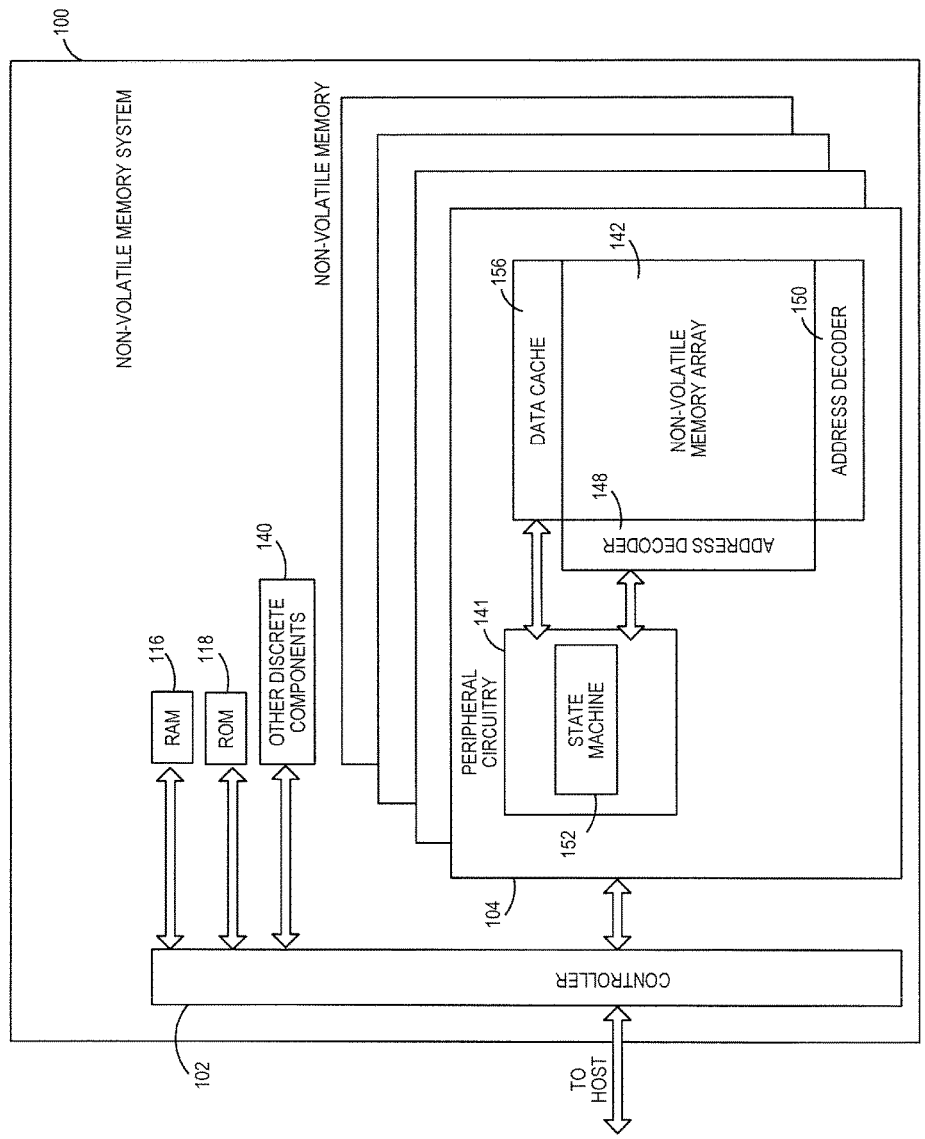
FIG. 2B is a block diagram illustrating exemplary components of the non-volatile memory storage system illustrated in FIG. 1A according to an embodiment.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Non-volatile memory die 104 further includes a data cache 156 that caches data.

Peripheral circuitry 141 includes a state machine 152 that provides status information to controller 102. The circuitry 141 can provide additional functionality, which will be described in more detail below. In general, "circuitry" can include one or more components and be a pure hardware implementation and/or a combined hardware/software (or firmware) implementation. Accordingly, "circuitry" can take the foam of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example.

Figure 3:
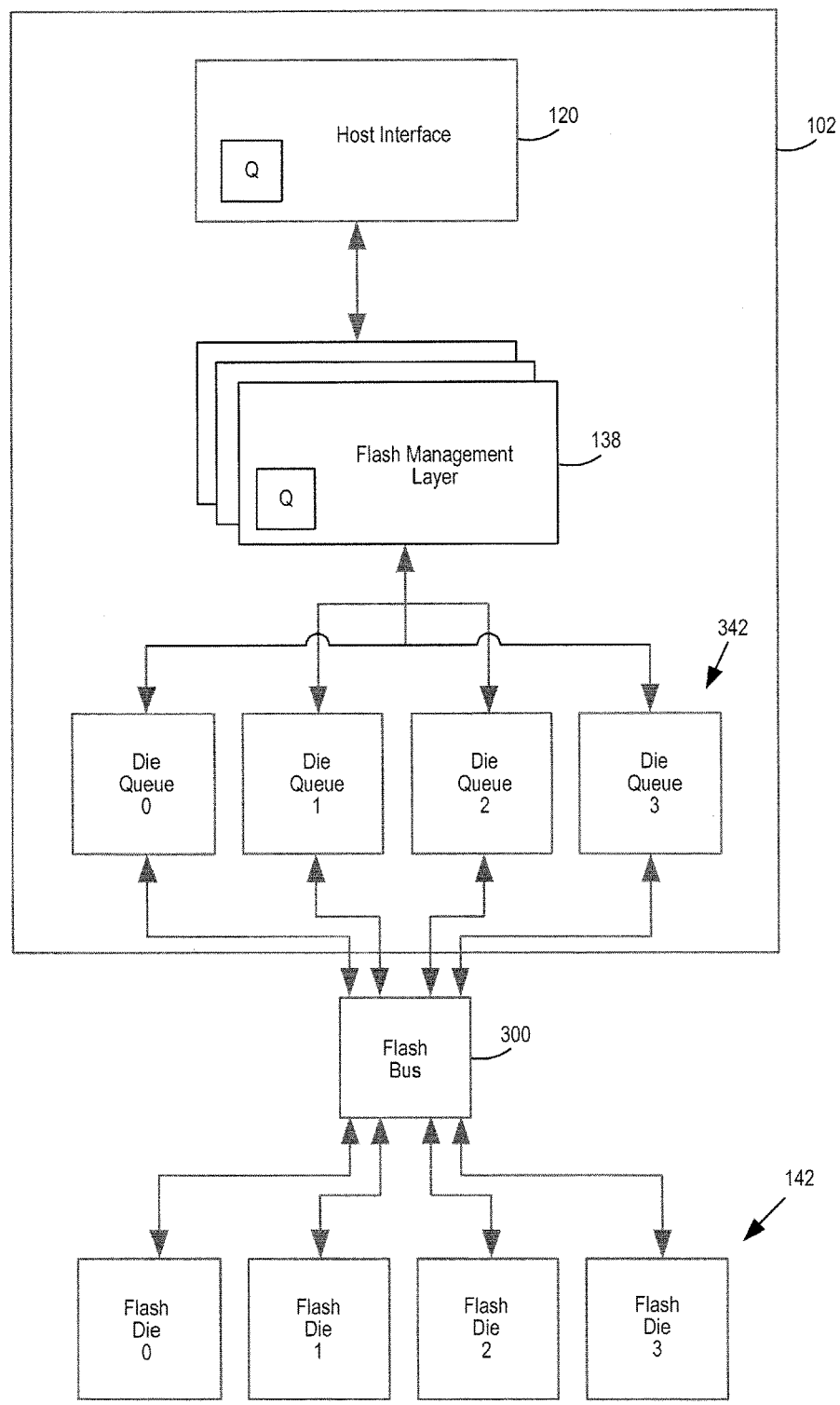
FIG. 3 is a diagram illustrating a memory system of an embodiment.

FIG. 3 is a diagram showing another view of the interaction between the controller 102 and the memory arrays 142 of the memory dies 104. Some of the components in this figure are similar to those shown in the other figures and additional components are shown. However, FIG. 3 is a simplified drawing for illustration purposes. As shown in FIG. 3, the controller 102 contains a host interface 120, a plurality of flash management layers 138, and a plurality of die queues 342 that corresponds to the plurality of flash dies 142 in the plurality of memory dies 104. (A die queue is sometimes referred to as a thread or a FIM thread, where each thread can have a queue of commands.) The controller 102 is in communication with the plurality of flash dies 142 in the plurality of memory dies 104 via a flash bus 300. Since there is only a single flash bus 300 connecting the controller 102 to the memory dies 104, data can only be transferred to one memory die at a time. Accordingly, even though each die can perform operations in parallel (die parallelism), because there is only a single flash bus 300, there is no die parallelism for data transfer.

In operation, when a command is received from the host by the controller 102 via the host interface 120, it is sent to the flash management layer 138, which determines which die queue to send it to. As the various die queues fill up with commands, firmware in the controller 102 determines which commands to send over the flash bus 300 to the appropriate memory die 104 and when to send them.

Figure 4:
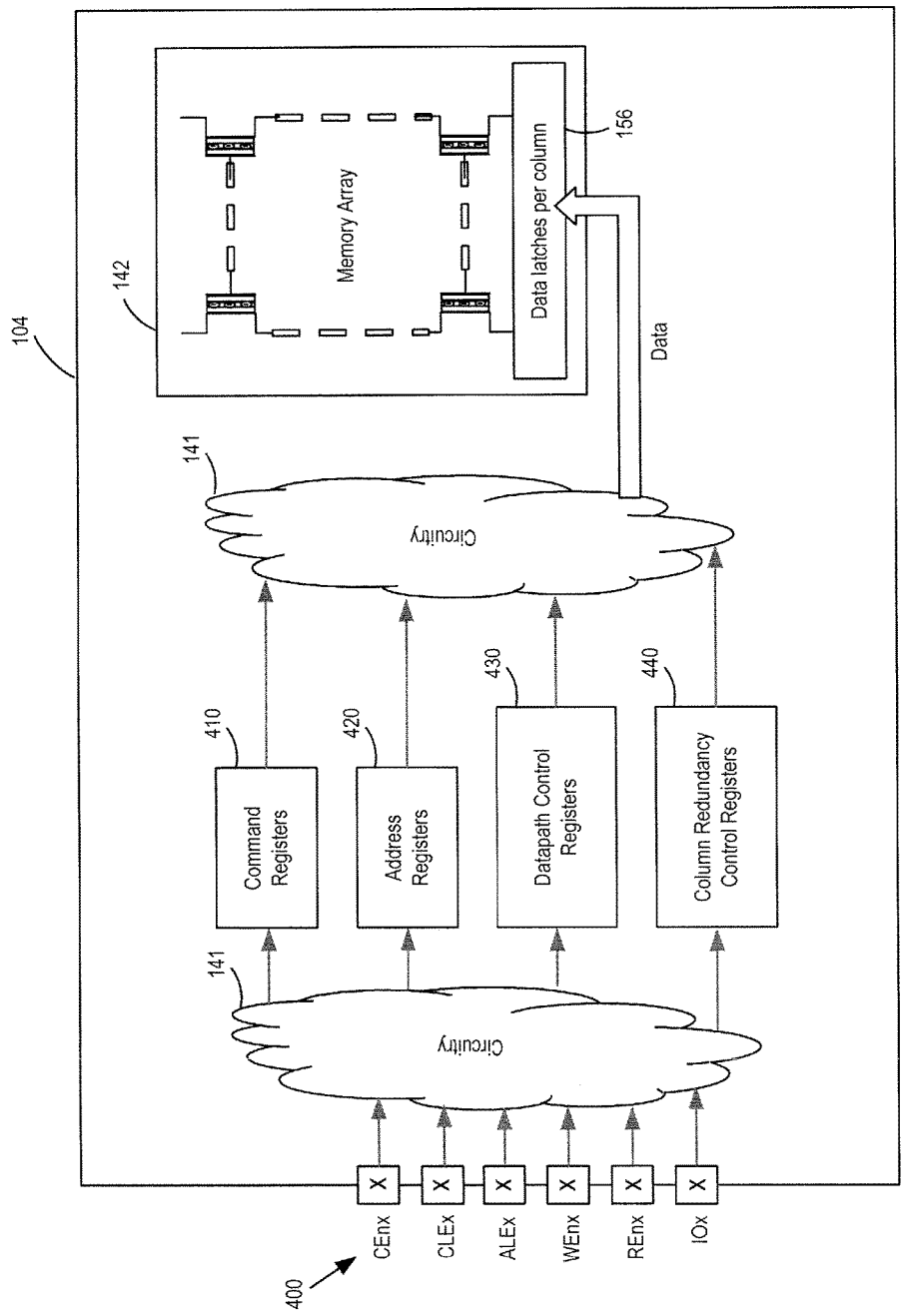
FIG. 4 is a diagram illustrating a non-volatile memory of an embodiment.

FIG. 4 is a diagram of a memory die 104 of an embodiment. As shown in FIG. 4, in this embodiment, the memory die 104 comprises an interface 400 with a plurality of pins, which here are chip enable (CE), command latch (CLE), address (ALE), write enable (WE), read enable (RE), and data transfer (JO). The memory die 104 of this embodiment also comprises a command register 410, an address register 420, a datapath control register 430, a column redundancy control register 440, circuitry 141, and a memory array 142 with a plurality of data latches 156. The command register 410 stores a command (e.g., read or write) to be performed in the memory array 142. The address register 420 holds that address(es) of the memory location in the memory array 142 for the command stored in the command register. The datapath control register 430 keeps track of what data has been written to the memory array 142, and the column redundancy control register 440 hold data for determining which replacement columns to use to replace damages columns. Of course, these registers are just examples, and fewer, more, or different registers can be used.

It should be noted that this is merely one implementation, and other implementations can be used (e.g., different pins or a different interface, fewer (e.g., at least one), more, or different registers, etc.). Also, while the circuitry 141 is shown as being distributed in FIG. 4, it should be understood that the circuitry can be implemented in any suitable manner and in any suitable physical arrangement on the memory die 104. Further, the circuitry 141 can be configured to perform the below functions in any suitable way (e.g., by configuring hardware components to perform the logic described below). As noted above, this memory die 104, along with the other memory dies in the system, are connected to a single bus, where all interface pins are common for each die.

Figure 5:
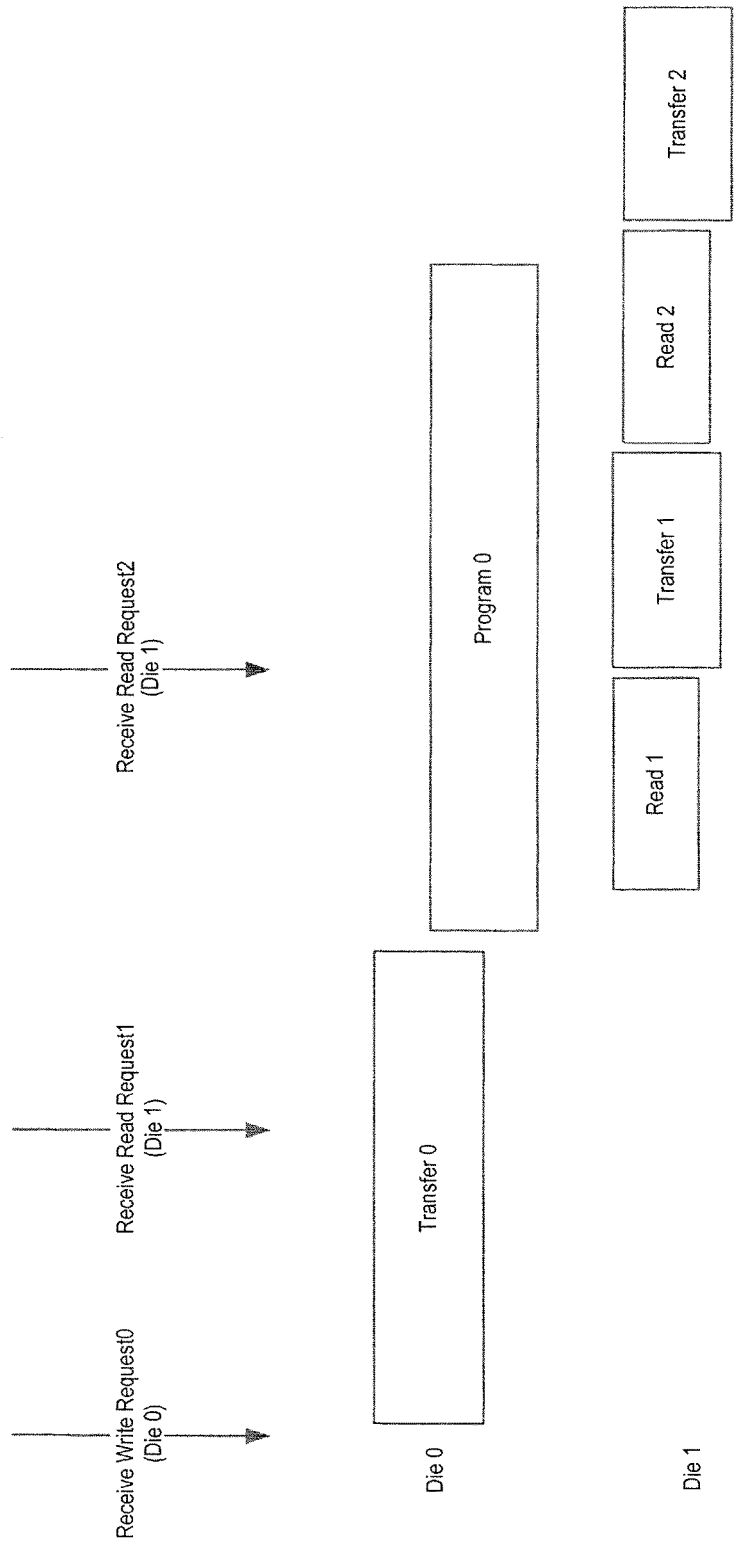
FIG. 5 is a flow diagram of an embodiment in which a read request to one die is delayed until a data transfer to another die is completed.

FIG. 5 illustrates the flow between the controller 102 and the plurality of memory dies 104 (here, die 0 and die 1) of an embodiment. As shown in FIG. 5, after receiving a request from the controller 102 to write to die 0, the IO pin of the bus is busy transferring data from the controller 102 to die 0. During this time, if the controller 102 wants to send a read request to die 1, the controller 102 is prevented from doing so, because the bus is busy with transferring data to die 0. After that data transfer is complete and the bus is free, the read request can be sent to die 1. Although there is no die parallelism in the transfer process (because there is only one bus), there is die parallelism in the operations in the dies. So, as shown in FIG. 5, the program operation can happen on die 0 as the read operation is happening on die 1. As also shown in FIG. 5, if two read requests are sent to die 1 (e.g., a read and a control read), not only can those two read operations occur in parallel to the program operation in die 0, but the data from those two read operations can be transferred out over the data pins because they are not being used by die 0 (e.g., the reads could be a control read followed by a host read or two host reads for which the addresses are cached and are requested at different times).

While this flow may work for some systems, as noted above, some memory systems give priority to read commands and have read response latency requirements, requiring a read command be serviced in a certain period of time (e.g., 50 microseconds). So, with reference to FIG. 5, when the controller 102 wants to issue the first read request to die 1, the controller 102 would stop the data transfer to die 0 to free up the bus to send the read request to die 1. After the read command is sent, the bus would be free, and the controller 102 could resend the write command to die 0. However, this may require the controller 102 to start the write data transfer from the beginning, resulting in re-sending previously-sent data because a read command send to die 1 can cause the registers in die 0, which keep track of how many bytes were transferred, to be erased.

More specifically, because there is only one bus, the pins of the bus are connected to each die. When the controller 102 places a command on the bus, each memory die receives that command and stores it in its register. Although a selection signal is eventually sent to the memory die to process the command, by the time that happens, any data that was previously stored in the registers of the other memory dies is lost. For example, in one implementation, part of the address configuration can be used to select a particular die. However, the first two cycles of the address are for the column address, the third cycle is for the wordline address, and the fourth and fifth cycles specify the plane address, block address, and chip address. So, it is not until the fifth cycle that any given memory die will know that it is selected. Until then, each memory die latches the same information that the controller 102 puts on the bus, which replaces the data previously stored in the registers of die 0.

One way in which to address this problem is to have the controller 102 keep track of what data was already sent to the memory die and somehow be able to resume the data transfer from where it left off. However, this would require complex scheduling on the flash interface module to keep track of how many bytes was toggled and to maintain a set of contexts for the command. The following embodiments can be used to avoid such a complex scheduling mechanism. In these embodiments, the memory die retains the information in its registers and can provide the information back to the controller 102, so the controller 102 can resume the data transfer from the point at which it left off.

In one embodiment, the circuitry 141 in the memory die 104 is configured to receive a pause command from the controller 102 and, in response to receiving the pause command, pause a data transfer between the memory die 104 and the controller 102. (It should be noted that the data transfer could be for a write command (i.e., data coming into the memory die 104 to be written) or for a read command (i.e., data read from the memory die 104 and to be sent to the controller 102). While the data transfer is paused and until the memory die 104 is selected again by the controller 102, the memory die 104 maintain the state(s) of one or more of the registers 410, 420, 430, 440 irrespective of inputs received via the interface 400 that would otherwise change the state(s) of the registers 410, 420, 430, 440. That way, when the data transfer is to be resumed, the memory die would still have data in its registers 410, 420, 430, 440 that it can provide to the controller 102, so that the controller 102 can resume the data transfer from the point at which it left off.

Figure 6:
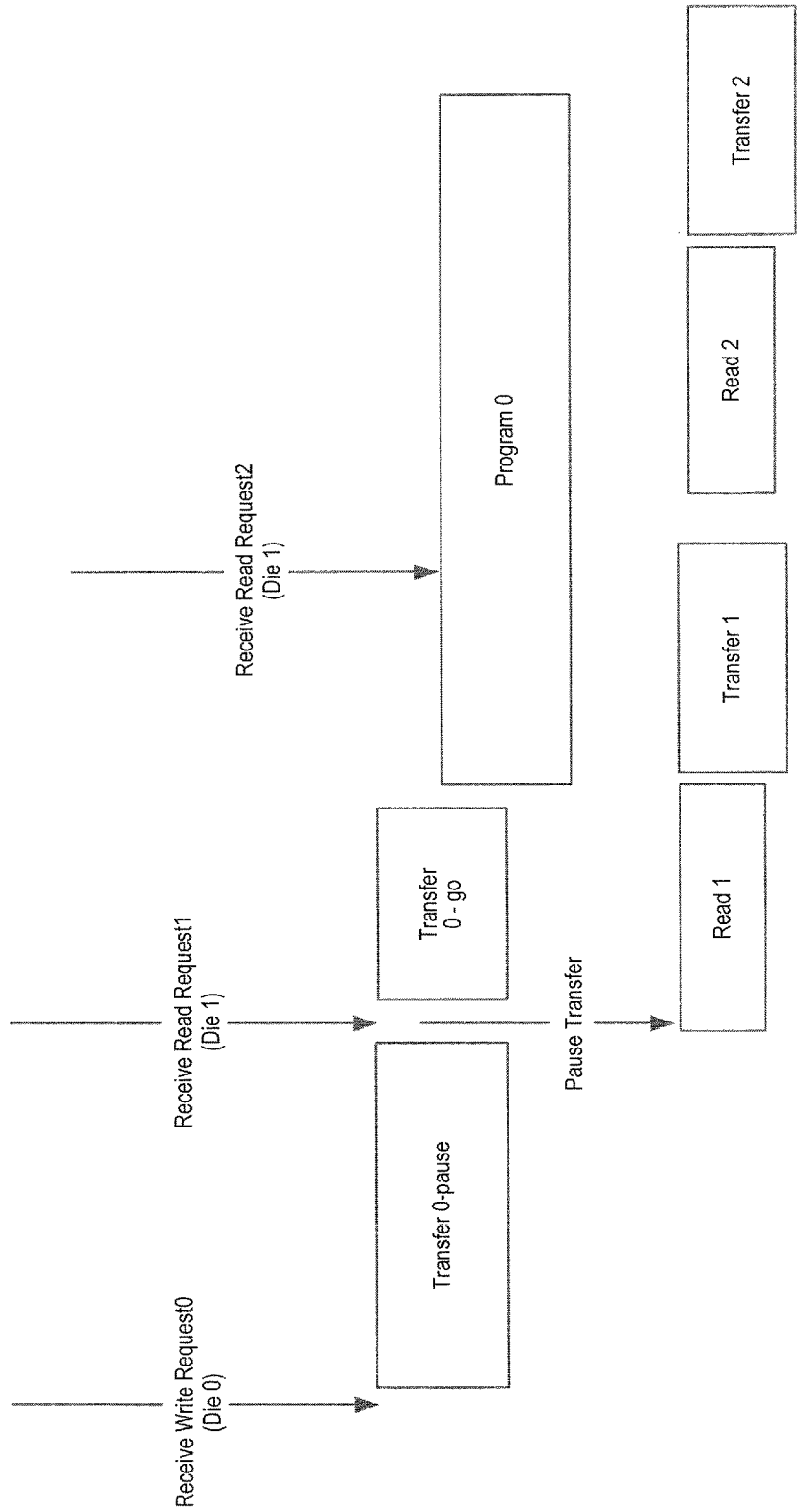
FIGS. 6 and 7 are flow diagrams of an embodiment in which a data transfer to one die is interrupted to service a read to another die.
Figure 7:
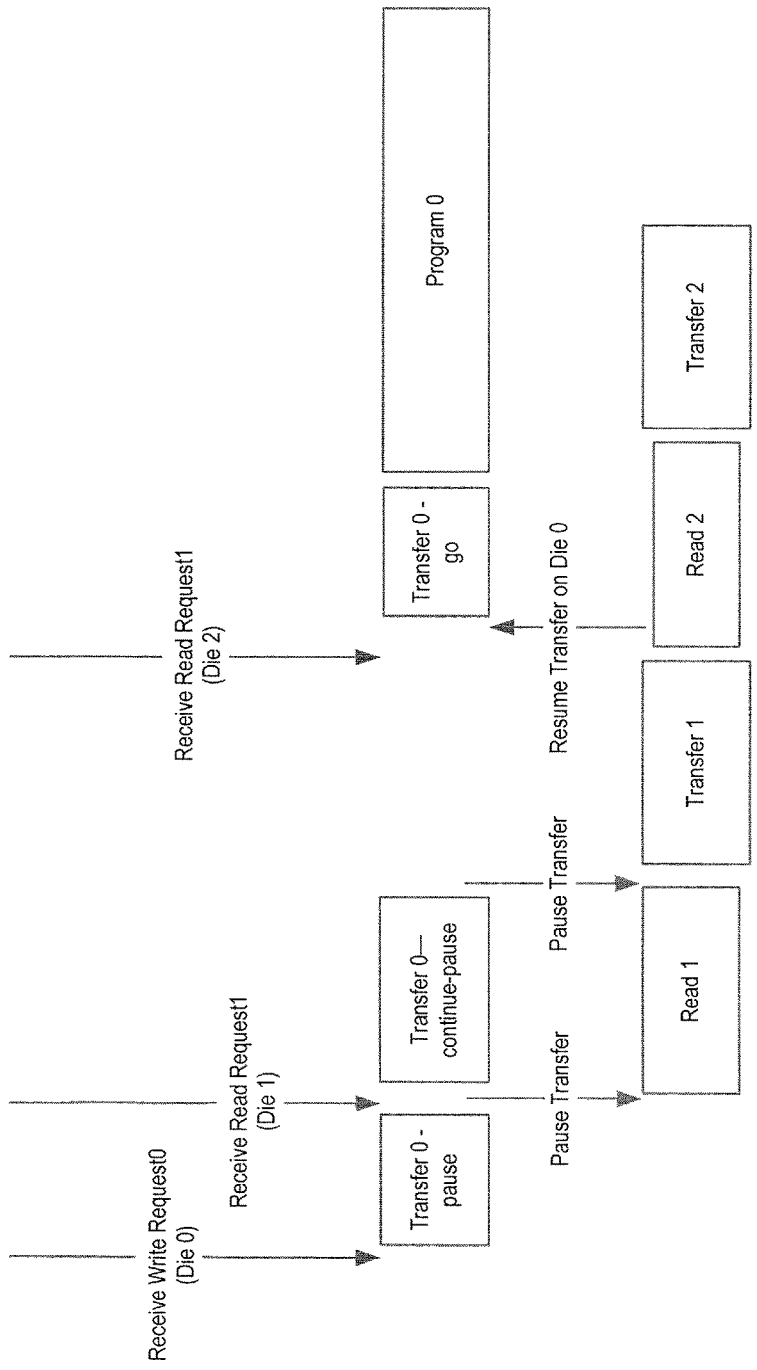

The operation of this embodiment is illustrated in FIGS. 6 and 7. Again, the general idea is to resume a read toggle on a selected die (die 0) from the point it was previously stopped (or paused). This allows for switching to other dies for more operations before coming back to die 0 to resume data transfer.

FIG. 6 shows a data transfer occurring between the controller 102 and die 0 in response to a write request sent to die 0. As that data transfer is occurring, the controller 102 sends a pause command to die 0, which causes it to ignore all subsequent commands (until a resume command is received) to effectively "freeze" the data that is stored in one or more of its registers 410, 420, 430, 440. With the bus now free, the controller 102 sends a read request to die 1, which causes die 1 to read the requested data from its memory array. During this time, the bus is again free, so the controller 102 sends a resume command to die 0. In response to this command, die 0 sends the relevant information from its registers 410, 420, 430, 400 to the controller 102, so the controller 102 can resume data transfer for the write operation from the point at which it left off. When the data transfer to die 0 is complete, die 0 performs the program operation, which does not require the bus. Accordingly, the bus is free to transfer the data read in response to the read command to die 1, as well as receive and send out data in response to a second read command to die 1.

FIG. 6 shows that when the data transfer was paused on Die 0, a "read/sense" command was issued to Die 1 without any data transfer immediately following the command. This shows that there does not always need to be a data transfer on Die 1 after a pause on Die 0. However, in one embodiment, if the command were a write command instead of a read command, a data transfer from Die 1 would follow the write command to Die 1 before resuming transfer on Die 0.

In FIG. 6, the read operation to die 1 finished and the second read request to die 1 was received after the data transfer to die 0 was complete. In FIG. 7, the read operation to die 1 finishes (and the second read request is received) before the data transfer to die 0 is complete. In this situation, the controller 102 pauses the data transfer to die 0 a second time, so the bus can be free to transfer the read data from die 1 and also to receive the second read request to die 1. Of course, these are merely examples, and the data transfer can be paused and resumed more than two times.

As noted above, any suitable implementation can be used, and many variations are possible. For example, in one implementation, the circuitry 141 in the memory die 104 monitors commands received by the interface 400 for a pause command. When the pause command is detected, the circuitry 141 monitors commands received by the interface 400 for a resume command. Until the resume command is received, the circuitry 141 prevents incoming commands and data from disrupting data stored in at least one of the registers 410, 420, 430, 440. Also, these embodiments can be extended to multiple dies (e.g., within the same FIM). For example, the transfer on Die 0 can be paused to service reads from Dies 1 to n, for example.

The following exemplary syntax illustrates an operation in which the controller 102 streams 40 columns of data to die 0, switches to die 1 for another operation (e.g., sense, fold, or erase), and then comes back to die 0 and continues streaming in data from column 41 onwards. In this example, CMD_XX is the pause command, and CMD_YY is the resume command.

80h-die0—data stream in data to 40 columns—CMD_XX (to hold),
    Select-die1-issue-read-command,
    Select-die0—continue to stream in data from column 41—*can issue hold command any number of times here*—CMD_10 to start program.

The following exemplary syntax illustrates a "read-hold-and-go" usage 05h-die0-E0h—data stream out (10 columns)—CMD_XX (to hold),
    Select-die1-issue-operation-command,
    Select-die0—continue to write data to Column 11 onwards—CMD_YY to reset hold when done toggling.

Any time before CMD_YY is issued, a die switch can happen.

While separate pause (e.g., CMD_XX) and resume (e.g., CMD_YY) commands were used in the above examples, it should be noted that other implementations can be used. For example, the receipt of a read and/or write command during a data transfer can be interpreted by the circuitry 141 as an implicit pause command. Also, instead of receiving an express resume command, the circuitry 141 can interpret a command to select the memory die as an implicit resume command. Alternatively, the circuitry 141 can be configured to detect signals on the bus, or use a timer, to determine when the priority communication on the bus is complete and the paused data transfer can resume.

Figure 8:
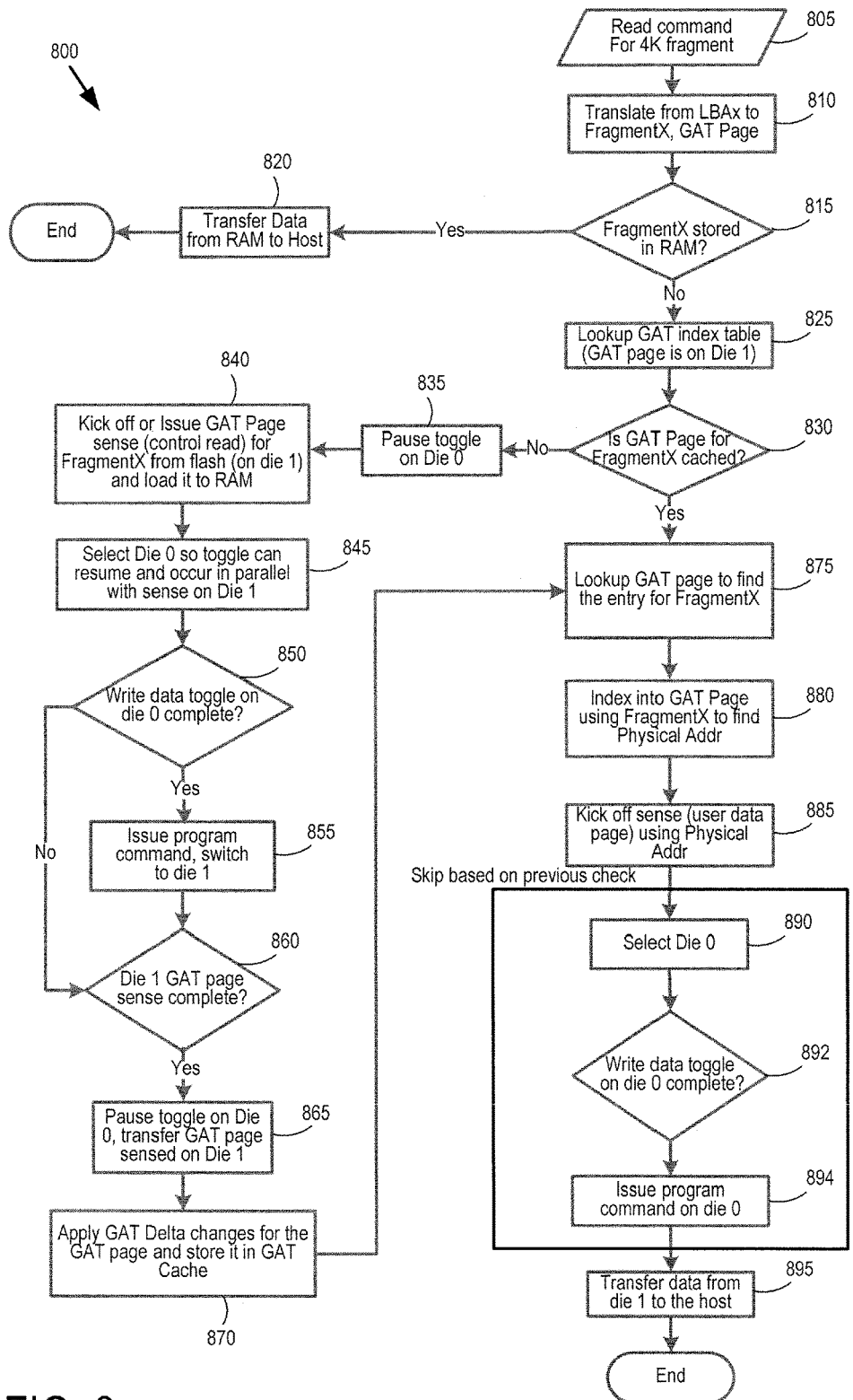
FIG. 8 is a flow chart of a method of an embodiment for reducing latencies in a multi-die environment.

Turning again to the drawings, FIG. 8 is a flow chart 800 of a method of an embodiment for reducing latencies in a multi-die environment. It should be noted that this flow chart is being presented merely to illustrate one possible embodiment. The acts shown in this flow chart and the specific commands and units discussed therein should not be read into the claims unless expressly recited therein.

As shown in FIG. 8, the controller 102 first receives a read command for a 4K fragment (act 805) and translates the logical block address (LBA) from the command to a FragmentX, group address table (GAT) syntax (act 810). Next, the controller 102 determines if FragmentX is stored in RAM 116 (act 815). If it is, the controller 102 transfers the data from RAM 116 to the host (820). If it isn't, the controller 102 looks up the GAT index table (in this embodiments, the GAT page is on die 1) (act 825) and then determines if the GAT page for FragmentX is cached (act 830). If it's not cached, the controller 102 sends a pause command (toggle) on die 0 (act 825) to pause the data transfer. The controller 102 then kicks off or issues a GAT page sense (control read) comment for FragmentX from flash (die 1) and loads it into RAM 116 (act 840). The controller 102 then selects die 0, so the toggle can resume and occur in parallel with the sense on die 1 (act 845). The controller 102 then determines if the data toggle on die 0 is complete (act 850). If it is, the controller issues a program command and switches to die 1 (act 855). Then (or if the decision to 850 was no), the controller 102 determines if the die 1 GAT page sense is complete (act 860). If it is, the controller 102 pauses the toggle on die 0 and transfers the GAT page sensed on die 1 (act 865). The controller 102 then applies the GAT delta changes for the GAT page and stores it in the GAT cache (act 870).

Next (or if the answer to decision 830 is yes), the controller 102 looks up the GAT page to find the entry for FragmentX (act 875). The controller 102 then indexes into the GAT page using FragmentX to find the physical address (act 885). Then, the controller 102 kicks of the sense (user page) using the physical address (act 885). The controller 102 then selects die 0 (act 890), determines if the write data toggle on die 0 is complete (act 892), and then issues a program command on die 0 (act 894). (Acts 890-894 can be skipped based on the previous check.) Finally, the controller 102 transfers the data from die 1 to the host (act 895).

There are many advantages associated with these embodiments. For example, pausing the data transfer between a memory die 104 and the controller 102 avoids the controller 102 having to wait until the data transfer between the controller 102 and the memory die 104 is complete before sending a data transfer request to another memory die. This provides particular advantage in situations where the memory system gives priority to read commands and have read response latency requirements, requiring a read command be serviced in a certain period of time. For example, with reference again to FIG. 5, if Die 0 is in the middle a long transfer-in (before a write command, say) of data, and a read command appears for Die 1, it can only be processed after the entire transfer on Die 0 is completed, and this might result in the system not meeting the read response latency target. However, by pausing the transfer on Die 0 (as shown in FIG. 6), a read sense command can be issued on Die 1, so it is hidden under the Die 0 transfer. Once the sense is complete, the transfer on Die 0 can be paused again to go back to Die 1 to transfer out the sensed data, thereby meeting the latency requirement.

These embodiments also provide better performance and less complexity than alternate solutions that require complex FIM harware scheduling, as well as reduce latencies and complexities arising from having to issue prefixes (such as A2, column select, etc.).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A memory die comprising:
   a memory array;
   an interface in communication with a bus shared with at least one other memory die;
   at least one register; and
   circuitry in communication with the memory array, the interface, and the at least one register, wherein the circuitry is configured to:
   receive, via the interface, a pause command from a controller in communication with the memory die;
   after receiving the pause command, pause a data transfer between the memory die and the controller;
   while the data transfer is paused and before a resume command is received:
   receive, via the bus, a command intended for one of the at least one other memory die, wherein the command is received prior to receiving a die selection signal associated with the command;
   ignoring the command instead of storing the command in the at least one register, wherein state(s) of the at least one register are maintained even though the command was received
   receive, via the interface, the resume command from the controller; and
   in response to receiving the resume command:
   send the maintained state(s) of the at least one register to the controller so that the data transfer can resume from a point at which it left off when the data transfer was paused.

2. The memory die of claim 1, wherein the data transfer between the memory die and the memory controller is in response to a write command.

3. The memory die of claim 1, wherein the data transfer between the memory die and the memory controller is in response to a read command.

4. The memory die of claim 1, wherein the interface comprises pin(s) for at least one of the following: chip enable, command latch, address, write enable, read enable, data transfer.

5. The memory die of claim 1, wherein the at least one register comprises one or more of the following registers: a command register, an address register, a datapath control register, and a column redundancy control register.

6. The memory die of claim 1, wherein the memory array comprises a three-dimensional memory array.

7. The memory die of claim 1, wherein the memory die is part of a memory system embedded in a host.

8. The memory die of claim 1, wherein the memory die is part of a memory system removably connected to a host.

9. A memory system comprising:
   a plurality of memory dies; and
   a controller in communication with the plurality of memory dies via a common bus, wherein the controller is configured to:
   place on the bus a first command and a signal selecting a first memory die of the plurality of memory dies, wherein the first command is to pause a data transfer between the controller and the first memory die;
   while the data transfer between the controller and the first memory die is paused, place on the bus a second command and a signal selecting a second memory die of the plurality of memory dies, wherein the first memory die is configured to, prior to receiving the signal selecting the second memory die, ignore the second command instead of storing the second command in at least one register in the first memory die, wherein state(s) of the at least one register in the first memory die are maintained even though the second command was received by the first memory die via the bus;
   place on the bus a third command and a signal selecting the first memory die, wherein the third command is to resume the data transfer between the controller and the first memory die, wherein the first memory die is configured to, in response to receiving the third command, send the maintained state(s) of the at least one register in the first memory die to the controller; and
   analyze the maintained state(s) of the at least one register of the first memory die to determine a point at which the controller left off when the data transfer to the first memory die was paused.

10. The memory system of claim 9, wherein the data transfer between the first memory die and the controller is in response to a write command.

11. The memory system of claim 9, wherein the data transfer between the first memory die and the controller is in response to a read command.

12. The memory system of claim 9, wherein at least one of the plurality of memory dies comprises a three-dimensional memory array.

13. The memory system of claim 9, wherein the memory system is embedded in a host.

14. The memory system of claim 9, wherein the memory system is removably connected to a host.

15. The memory system of claim 9, wherein the controller comprises a host interface, a memory management layer, and a plurality of die queues for the respective plurality of memory dies.

16. A memory system comprising:
    first and second memory dies;
    a bus shared by the first and second memory dies;
    means for placing on the bus a first command and a signal selecting the first memory die, wherein the first command is to pause a data transfer with the first memory die;
    means for, while the data transfer to the first memory die is paused, placing on the bus a second command and a signal selecting the second memory die, wherein the first memory die is configured to, prior to receiving the signal selecting the second memory die, ignore the second command instead of storing the second command in at least one register in the first memory die, wherein state(s) of the at least one register in the first memory die are maintained even though the second command was received by the first memory die via the bus;
    means for placing on the bus a third command and a signal selecting the first memory die, wherein the third command is to resume the data transfer with the first memory die, wherein the first memory die is configured to, in response to receiving the third command, send the maintained state(s) of the at least one register in the first memory die; and
    means for analyzing the maintained state(s) of the at least one register of the first memory die to determine a point at which the data transfer with the first memory die was paused.

17. The memory system of claim 16, wherein the data is being transferred in response to a write command.

18. The memory system of claim 16, wherein the data is being transferred in response to a read command.

19. The memory system of claim 16, wherein at least one of the first and second memory dies comprises a three-dimensional memory array.

20. The memory system of claim 16, wherein the memory system is embedded in a host.

21. The memory system of claim 16, wherein the memory system is removably connected to a host.

* * * * *